United States Patent [19]

Tanaka

[11] Patent Number: 5,662,073
[45] Date of Patent: Sep. 2, 1997

[54] ENGINE

[75] Inventor: Seiichi Tanaka, Hamamatsu, Japan

[73] Assignee: Sanshin Koygo Kabushiki Kaisha, Hamamatsu, Japan

[21] Appl. No.: 511,354

[22] Filed: Aug. 4, 1995

[30] Foreign Application Priority Data

Aug. 4, 1994 [JP] Japan .................................. 6-183543

[51] Int. Cl.$^6$ ..................................................... F02B 27/02
[52] U.S. Cl. ................................. 123/65 PE; 123/65 EM
[58] Field of Search .............................. 123/65 R, 65 PE, 123/65 EM, 65 P; 60/314

[56] References Cited

U.S. PATENT DOCUMENTS

| | | | |
|---|---|---|---|
| 1,818,796 | 8/1931 | Feyens | 123/65 PE |
| 2,393,341 | 1/1946 | Schneider | 123/65 PE |
| 4,312,308 | 1/1982 | Slattery | 123/65 EM |
| 4,714,056 | 12/1987 | Tottori et al. | 123/65 EM |
| 4,732,117 | 3/1988 | Tanahashi et al. | 123/65 PE |
| 4,732,118 | 3/1988 | Tanahashi et al. | 123/65 PE |
| 4,766,854 | 8/1988 | Riese | 123/65 PE |
| 5,134,851 | 8/1992 | Davis | 123/65 EM |

*Primary Examiner*—David A. Okonsky
*Attorney, Agent, or Firm*—Knobbe, Martens, Olson & Bear LLP

[57] ABSTRACT

An exhaust arrangement for an internal combustion engine wherein the timing of the cylinder events is such that the exhaust port of one cylinder opens before the exhaust port of another cylinder closes so as to improve scavenging and performance. In preferred embodiments, the engine is of a 2-cycle type and the exhaust port of the one cylinder also opens before the scavenge port of the other cylinder closes. The principle is also depicted in conjunction with a four cylinder engine.

20 Claims, 12 Drawing Sheets

ENGINE

BACKGROUND OF THE INVENTION

The invention relates to an engine and more particularly to an improved exhaust timing arrangement for an engine and particularly for engines of the 2-cycle type.

As is well known, the performance of an engine can be significantly affected by the exhaust system. The exhaust system can be tuned depending upon the number of cylinders served by a common exhaust pipe, the firing order of those cylinders, the timing of the opening of the exhaust ports of those cylinder served and the length of the exhaust system. This exhaust tuning is particularly advantageous in conjunction with 2-cycle engines.

Because of the scavenging process in a 2-cycle engine, the exhaust system can be more significant in determining the engine performance than with a 4-cycle engine. However, exhaust tuning is utilized with both 2- and 4-cycle engines.

In 2-cycle internal combustion engines, it is a common practice to attempt to utilize the exhaust pulses from one cylinder to effect the exhaust discharge and the scavenging of another cylinder. For example, it is frequently the practice to employ a technique called "exhaust supercharging." With this type of arrangement, the scavenging charge from one cylinder is permitted to pass at least in part through the exhaust port during the scavenging cycle. At the end of the scavenging cycle, an exhaust pulse is transmitted back to the exhaust port so as to drive part of the scavenged gases back into the cylinder and thus provide a charge in the cylinder which is higher than atmospheric pressure and which is substantially free of exhaust gases. Even if exhaust supercharging is not employed, the effective exhaust pulses can be utilized to ensure that scavenging is complete, but also that none of the fresh air charge is permitted to the combustion escape chamber and to also insure that the exhaust gasses do not reenter the cylinder from which they have been discharged.

In order to provide effective exhaust tuning, it is frequently necessary to employ the interaction between two cylinders. However, it is also normally the practice to ensure that the engine cylinders fire in equal intervals so that smooth power transmission is possible. However, with engines having a certain number of cylinders, this then makes the use of exhaust pulses from one cylinder to the other to control the scavenging difficult or impossible.

This condition may be best understood by reference to FIGS. 1 and 2 which are, respectively, a timing diagram for a conventional prior art 2-cylinder in-line engine firing on equal intervals spaced 180° from each other and the pressure pulse curve in the exhaust manifold of the engine. The engine cylinders are indicated at 1 and 2 and their ignition points are indicated on the timing curve in FIG. 1. As will be seen, each spark plug of the respective cylinders 1 and 2 fires at approximately 5° to 10° before top dead center under the engine running condition.

It will also be seen from this figure that there is no overlap in the opening of the exhaust ports of the respective cylinders and, obviously, there is no overlapping of the opening of the exhaust port of one cylinder with the closing of the scavenge port of the other cylinder. As may be seen in FIG. 2, this gives rise to a situation where the exhaust pressure in the exhaust port area of the exhaust manifold is relatively high at the time when the scavenge port is opened. In addition the exhaust port pressure may become less than atmospheric to cause the exhaust gasses to reenter the cylinder.

This has two adverse effects. First, it dilutes the charge and raises the cylinder temperature. Second, it restricts the amount of fresh charge which can enter the cylinder. Thus the power developed is reduced. The exhaust pulses form one cylinder have substantially no effect on the exhaust pulses from another cylinder or the pressure condition at the exhaust port of the other cylinder.

In spite of this situation, it is possible with engines having equal firing intervals and no overlapping of their exhaust port openings to achieve exhaust tuning. In fact, this can also be achieved with a single cylinder by appropriately selecting the length of the exhaust pipe. This is done since it is known that an exhaust pulse is generated in the exhaust pipe which is reflected back from the end of the exhaust pipe to the exhaust port. Thus, by appropriately selecting the length of the exhaust pipe, it is possible to obtain this pulse back effect from a single cylinder or from cylinder-to-cylinder where the cylinders have no actual overlap in their timing.

However, the application of this principle to certain engine applications make such exhaust tuning difficult or impossible. For example, in outboard motor practice, a common environment in which 2-cycle engine are employed, the length of the exhaust pipe cannot be extended beyond a relatively short length. Thus, when the engines operates at relatively low maximum rotational speeds, i.e., 5,000 rpm or lower, it is practically impossible to obtain this type of exhaust control over the scavenging operation.

It is, therefore, a principal object of this invention to provide an improved exhaust tuning arrangement for an engine having at least a pair of cylinders.

It is a further object of this invention to provide an improved engine and exhaust system wherein the engine is configured in such a way so as to achieve the effect of exhaust tuning in assisting the charging of at least one of the cylinders.

It is a further object of this invention to provide an improved outboard motor engine and exhaust system.

SUMMARY OF THE INVENTION

This invention is adapted to be embodied in an internal combustion engine having at least two cylinders. Exhaust ports are provided for discharging exhaust gases from the cylinders. Means are provided for controlling the opening and closing of the exhaust ports of the cylinders. An exhaust system is provided for collecting the exhaust gases from the exhaust ports and delivering them to the atmosphere. This exhaust system has a common section that serves each of the exhaust ports. The relationship of timing of the two cylinders is such that the exhaust port of one of these cylinders opens at a time before the exhaust port of the other cylinder is closed.

DETAILED DESCRIPTION OF THE PREFERRED EMBODIMENTS OF THE INVENTION

Figure 1:
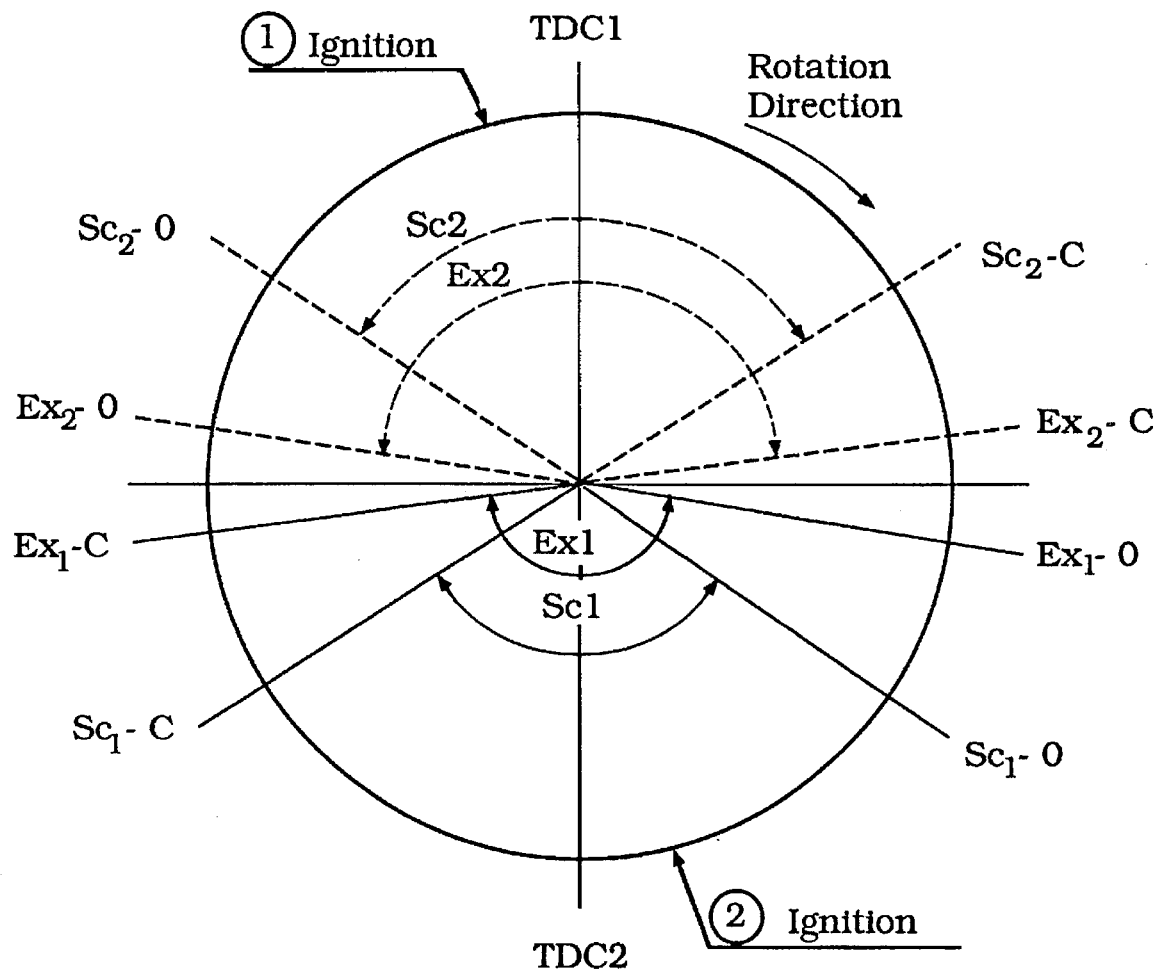
FIG. 1 is a graphical timing diagram showing the sequence of events in a prior art, two cylinder, 2-cycle internal combustion engine having equal firing impulses.

Referring now in detail to the drawings and initially to FIG. 1, an outboard motor constructed in accordance with an embodiment of the invention is shown partially in phantom and is identified generally by the reference number 21. As previously noted, the invention is described in conjunction with an outboard motor because it has particular utility with 2-cycle engines, which are normally used as the power plants in outboard motors. Also, the compact nature of outboard motors and the limitations on the design of their exhaust systems also gives this invention particular advantage in use with outboard motors regardless of whether they employ 2- or 4-cycle engines. It will be readily apparent to those skilled in the art how the invention may be practiced with other types of engines and With other types of applications for engines.

The outboard motor 21 includes a power head consisting of an internal combustion engine, indicated generally by the reference number 22 and a surrounding protective cowling shown in phantom. The protective cowling is comprised of a lower tray portion 23 and an upper main housing portion 24. The tray portion 23 is formed normally from a light weight material, such as aluminum or an aluminum alloy. The main cowling portion 24, on the other hand, is formed normally from an even lighter weigh material, such as a molded fiberglass reinforced resin or the like. The main cowling portion 24 is detachably connected to the tray 23 in a known manner.

Although further details of the construction of the engine 22 will be described later, it is mounted in the power head so that its crankshaft, shown in broken lines in this figure and identified by the reference numeral 25 rotates about a vertically extending axis. This is typical with outboard motor practice and is done so as to facilitate the coupling of crankshaft 25 to a drive shaft 26 by means of a spline connection 27.

The drive shaft 26 extend through a drive shaft housing 28 into a lower unit 29. In this lower unit 29, the drive shaft 26 drives a conventional forward, neutral, reverse transmission, shown schematically at 31. This transmission 31 selectively drives a propeller 32 in forward or reverse direction so as to drive a propeller 33 attached thereto in a like manner. In addition, the transmission 31 permits the drive shaft 26 to rotate without driving the propeller shaft 32.

The outboard motor 21 further includes a steering shaft (not shown) which is rotatably journaled within a swivel bracket 34 for steering of the outboard motor 21 about a generally vertically extending steering axis. The swivel bracket 34 is, in turn, pivotally connect by means of a pivot pin 35 to a clamping bracket 36 for tilt and trim movement of the outboard motor 21 about the axis defined by the pivot pin 35.

The clamping bracket 36 carries a clamping device 37 so as to afford detachable connection of the outboard motor 21 to a transom 38 of an associated watercraft 39, which is also shown in phantom.

Figure 3:
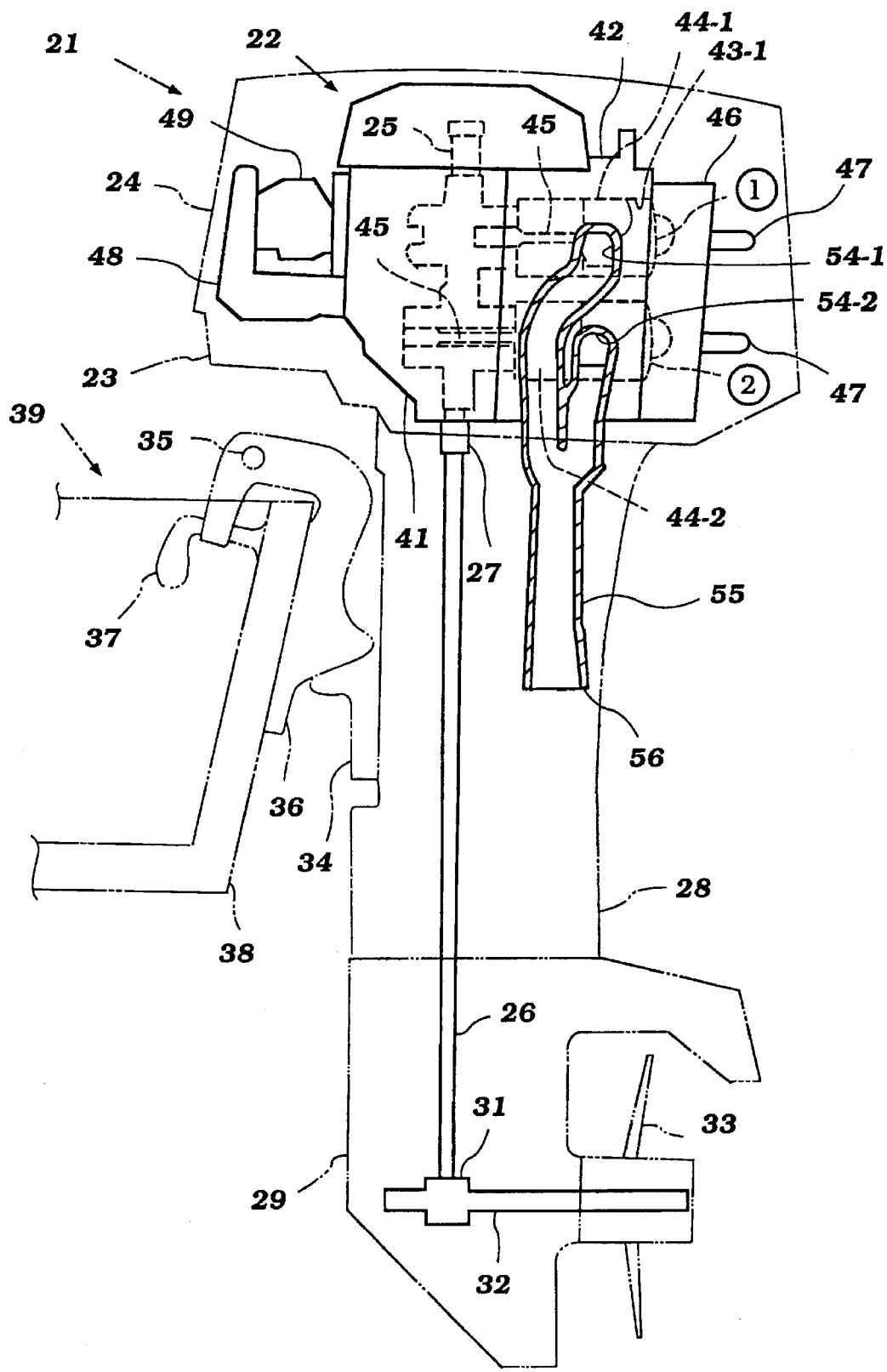
FIG. 3 is a side elevational view of an outboard motor constructed in accordance with an embodiment of the invention, with portions other than the engine shown in phantom and also showing its attachment to the transom of a watercraft, shown partially in phantom, and with a portion of the exhaust system broken away.

Continuing to refer to FIG. 3, it has been noted that, the crankshaft 25 rotates about a vertically disposed axis. Actually, the crankshaft 25 rotates in a crankcase chamber formed in part by a crankcase 41 that is detachably connected to a cylinder block 42. The cylinder block 42 is, in the illustrated embodiment, formed with two in-line cylinder bores 43-1 and 43-2. Pistons 44-1 and 44-2 reciprocate in the cylinder bores 43. The pistons 44 are, in turn, connected to connecting rods 45 which have their big ends journaled on the throws of the crankshaft 25 for transmitting drive to the crankshaft 25 from the pistons 44 in a well known manner.

A cylinder head assembly 46 is detachably connected to the cylinder block 42 in a known manner. The cylinder head 46 has recesses associated with each of the cylinder bores 43-1 and 43-2 so as to form the respective combustion chambers, indicated by the numbers (1 and 2) along with the pistons 44 and cylinder bores 43. Spark plugs 47 are mounted in the cylinder head 46 and are fired at the appropriate timing through an ignition system (not shown) which may be of any known type, but which has a firing order, as will be described later.

Continuing to refer primarily to FIG. 3, the crankcase chambers associated with each of the cylinder bores 43 are sealed from each other by a suitable sealing system, in a manner well known in 2-cycle crankcase compression engines. An induction system consisting of an air inlet device 48 and carburetors 49 supply a fuel air charge to the individual sealed crankcase chambers through reed valve assemblies, as is also well known in this art.

This charge is drawn into the individual crankcase chambers when the pistons 41 associated therewith are moving upwardly. This charge is compressed in the crankcase chambers as the pistons 41 move downwardly and then is transferred into the combustion chamber of the engine through scavenge passages which do not appear in FIG. 3, but which are shown schematically shown in FIG. 6. These scavenge passages are indicated in this figure by the reference numerals 51-1 and 51-2. The scavenge passages 51-1 and 51-2 terminate in respective scavenge ports 52-1 and 52-2 which are opened and closed by the movement of the respective pistons 44-1 and 44-2 in a manner well known in this art.

The charge which is transferred into the combustion chambers of cylinders 1 and 2 is then further compressed as the pistons 41 move upwardly. This further compressed charge is then fired by firing of the spark plugs 47 at the appropriate time interval so as to cause the charge to burn and expand and drive the pistons 41 downwardly in the cylinder bores.

This downward movement eventually opens a respective exhaust port 53-1 and 53-2 in each of the cylinders 1 and 2. The exhaust gases then exit through manifold runners 54-1 and 54-2 (see also FIG. 3) of an exhaust system including an exhaust manifold that is formed internally of the cylinder block 42 and an exhaust pipe 55 that depends into the drive shaft housing 28. The exhaust pipe opens into an expansion chamber (not shown) formed therein through the exhaust pipe discharge end 56.

It will noted that the distance between the exhaust port 54-1 is substantially greater than that between the exhaust port 54-2 and the exhaust pipe end 56. This difference in length causes actually a difference in performance between the lower most cylinder and the upper most cylinder.

From the expansion chamber in the drive shaft housing 58 the exhaust gases are discharged to the atmosphere through an appropriate exhaust discharge. This may be comprised of an under water high speed exhaust gas discharge and a restricted above the water low speed exhaust gas discharge. Such exhaust systems are well known in the art and, for that reason, further description of them is not believed to be necessary to understand and practice the invention.

Conventionally in two cylinder engines, the firing order and firing interval between the individual cylinders will be equally spaced. In other words, the cylinders will fire at 180° from each other as shown in the Prior Art FIG. 1. However, in accordance with this invention, the firing interval is changed so that the exhaust port 53-2 cylinder no. 2 will open at a time when the exhaust port 53-1 of cylinder no. 1 is still open. Preferably this is also at a time when its scavenge port 52-1 is also still open.

Figure 4:
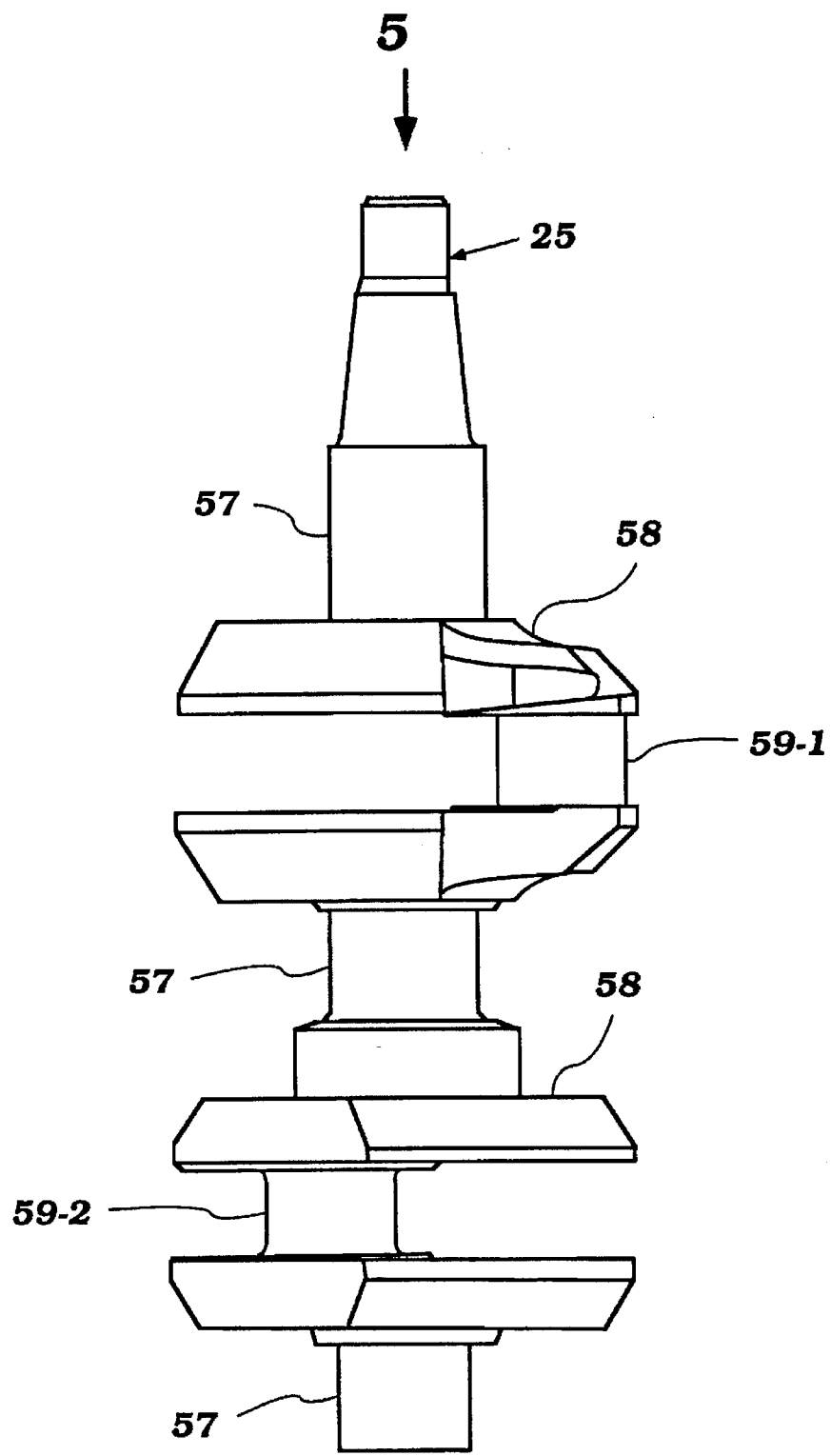
FIG. 4 is an enlarged side elevational view of the crankshaft of the engine shown in FIG. 3.
Figure 5:
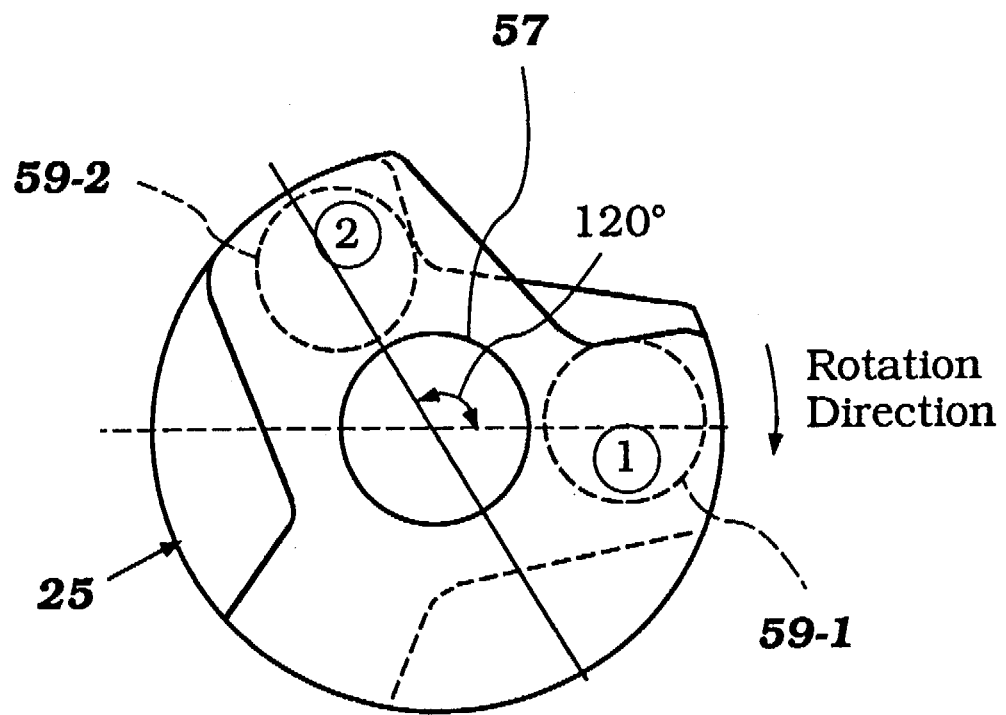
FIG. 5 is a top plan view of the crankshaft looking in the direction of arrow 5 in FIG. 1 and depicts the angle between the respective crank pins.

The way this effect is achieved may be understood by reference to FIGS. 4 and 5 wherein the crankshaft 25 is shown in more detail. The crankshaft 25 is formed with main bearing portions 57 which are journaled within the aforenoted crankcase chambers in a well known manner. Between these main bearing portions, the crankshaft is formed with throws 58 which define respective rod journal portions 59 on which the big ends of the connecting rods 45 are journaled in a manner well known in this art.

As may be seen in FIG. 5, the throw 59-1 associated with no. 1 cylinder is staggered from the throw 59-2 of cylinder no. 2 by 120°, in accordance with this embodiment, rather than the more conventional 180° stagger. The effect of this may be seen by the timing diagram of FIG. 7 and also by FIG. 6 which shows the condition at a certain predetermined crank angle.

Figure 6:
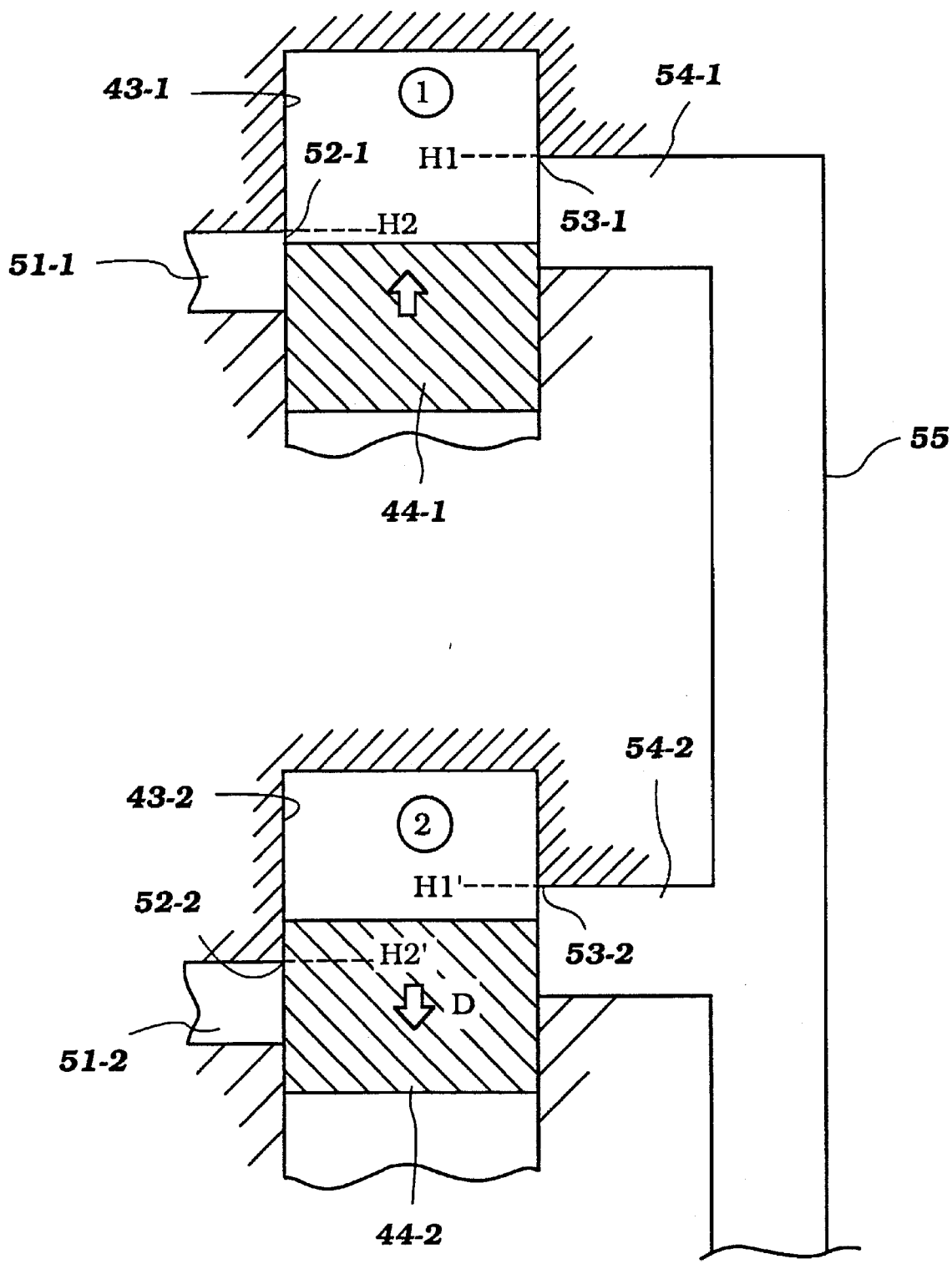
FIG. 6 is a partially schematic cross-sectional view showing the relationship of the two cylinders of the engine to each other and the conditions of their scavenge and exhaust ports at a time in the engine events.

Referring first to FIG. 6, it will be seen that the heights H1 and H2 associated with the distance between the top dead center position of each piston and the point when the exhaust ports 53-1 and 53-2 and scavenge ports 52-1 and 52-2, respectively, first open and also close. Because of this offset in condition, it will be seen that, when the piston 44-1 is moving toward its top dead center position in the completion of the scavenging cycle, the piston 44-2 will be moving to its bottom dead center at the beginning of its exhaust cycle. Hence, the exhaust pulses from cylinder no. 2 will have an effect at the exhaust port 53-1 of cylinder no. 1. This has an effect during the completion of the scavenging cycle as shown by the shaded area in the timing diagram of FIG. 7. The effect of this on the pressure curves will be understood by reference FIG. 8.

Figure 2:
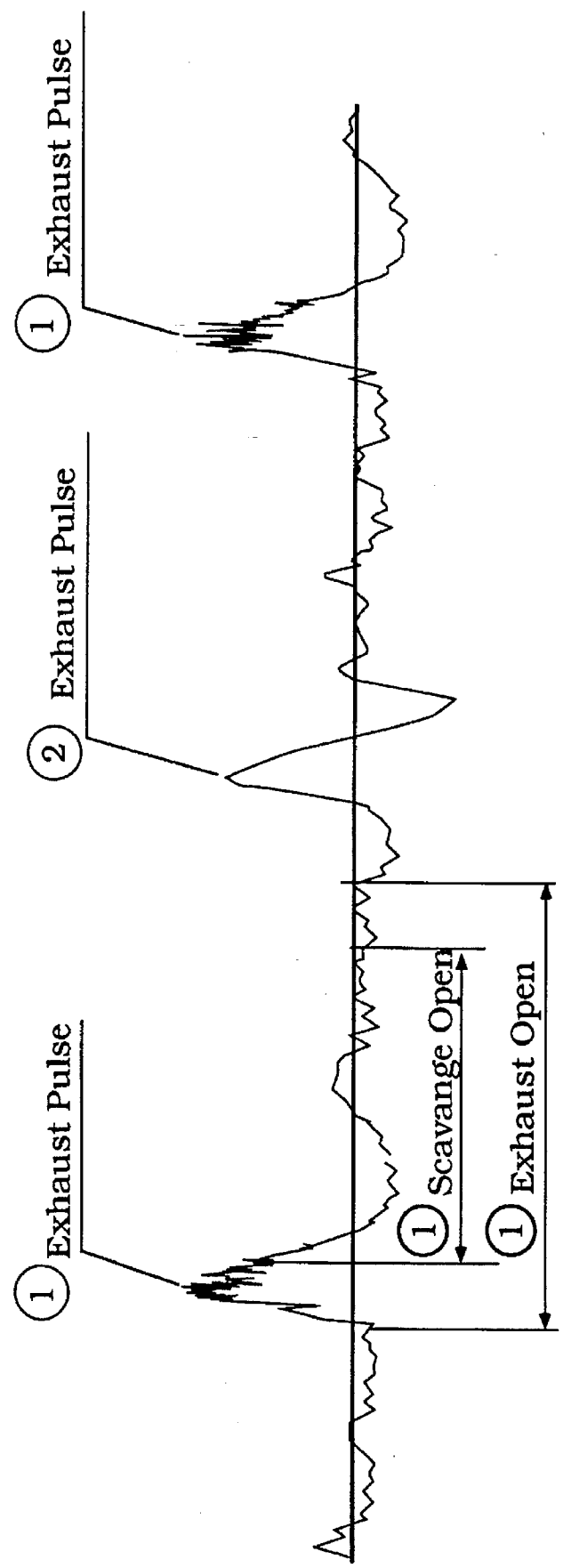
FIG. 2 is a graphical trace of the exhaust pressure in the common exhaust system during the operation of the prior art type of engine having a timing schedule as illustrated in FIG. 1.

This figure should also be compared with FIG. 2 which shows the similar conditions in the conventional engine having even firing intervals and wherein there is no overlap between the opening of the respective exhaust ports.

Thus, at the end of the scavenge cycle of cylinder no. 1, a pressure pulse form the exhaust of cylinder no. 2 will be transmitted back through the common portion of the exhaust system 55 and this will cause an elevated pressure in the exhaust port at the time when the scavenge port is still open rather than atmospheric pressure or less as with the prior art. This will preclude the passage of the fresh charge out of cylinder no. 1 into its exhaust port 53-1. This will also ensure that exhaust gases are not drawn back into the combustion chamber through the open exhaust port. Thus cylinder temperature will also be reduced and performance can be significantly increased in cylinder no. 1.

Figure 9:
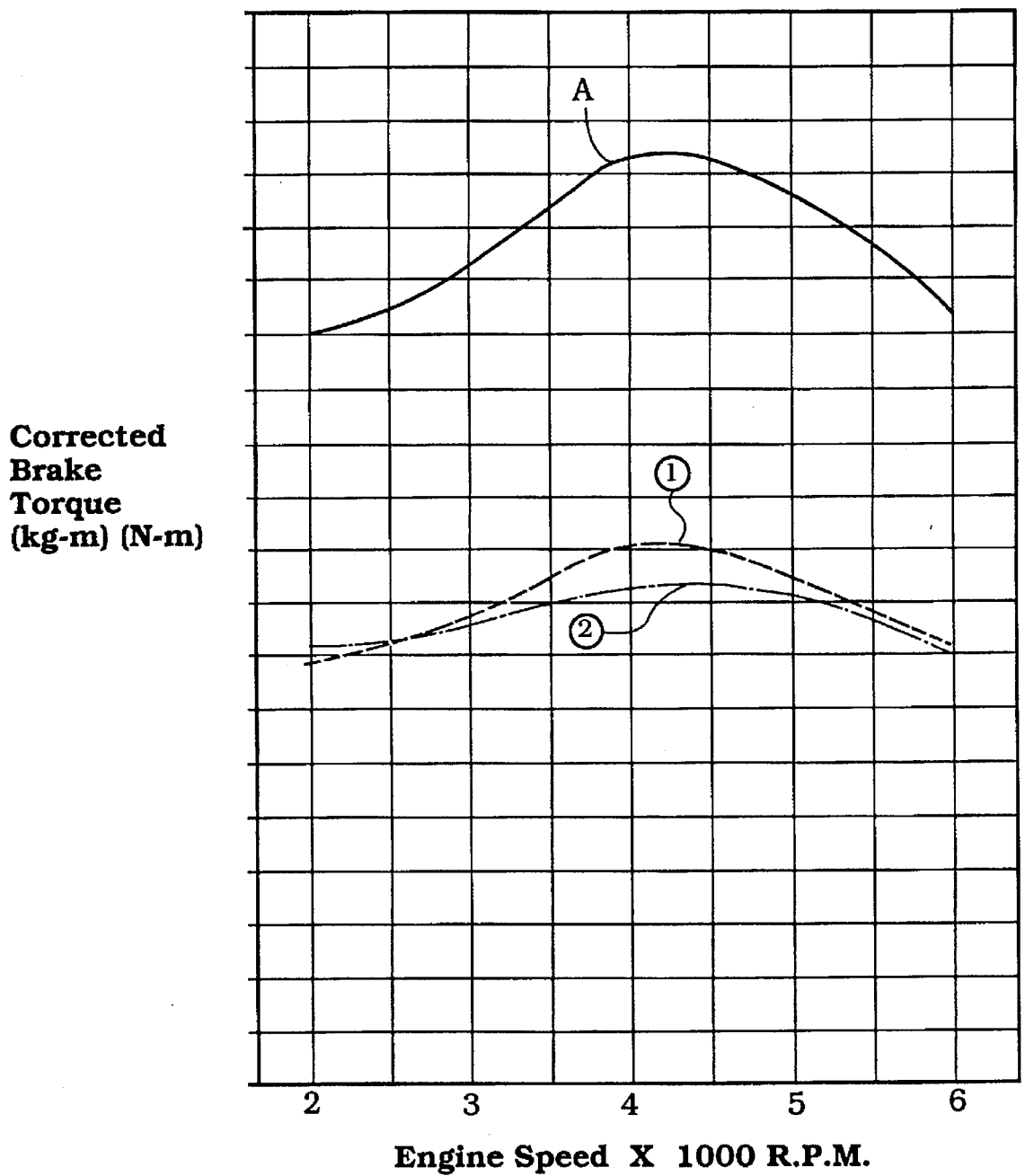
FIG. 9 is a graphical view showing the torque curve generated by each cylinder of the engine and the total torque curve in accordance with one specific preferred embodiment of the invention wherein the firing angle between the cylinders is 110°.
Figure 10:
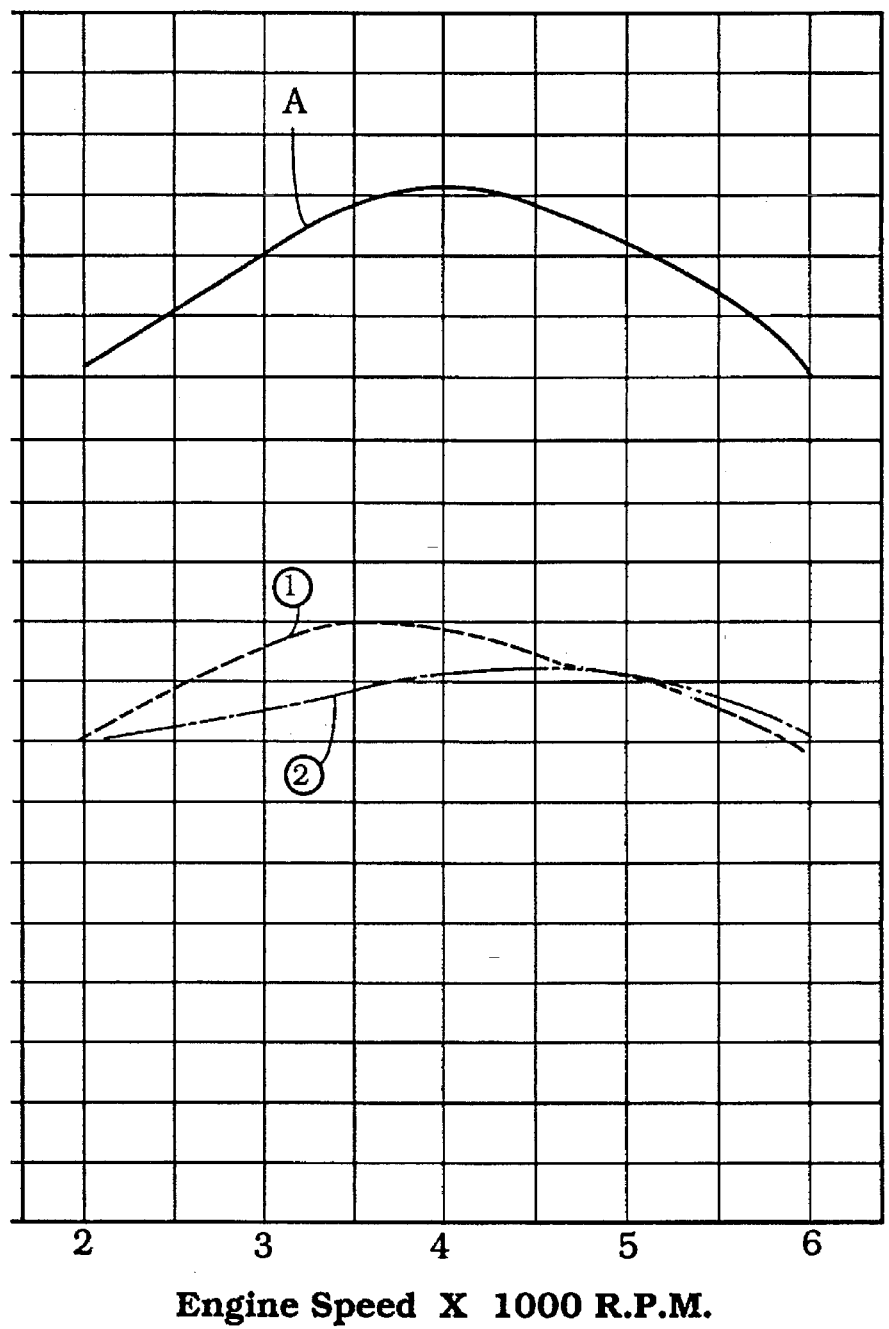
FIG. 10 is a graphical view, in part similar to FIG. 9, and shows another embodiment of the invention where the timing interval between the two cylinders is 130°.

This effect may be seen by the torque curves which are shown in FIGS. 9 and 10. Also, these figures show how the angle of offset can affect the actual torque curve.

FIG. 9 is a view that shows a condition where there is 110° rather than 120° offset between the firing of the two cylinders and, thus, affecting the overlap as aforedescribed. Thus, it will be seen that cylinder no. 2 generates a larger torque at mid-range than cylinder no. 1 and also a substantially higher torque than would occur if the exhaust pulses from one cylinder could not be utilized to affect another cylinder.

FIG. 10 shows the respective torque curves when there is a 130° timing interval. As may be seen, this has the effect of improving the torque curve of cylinder no. 1 at the lower end of the speed range while having its torque fall off more a the high speed end. Hence, by varying the angle utilizing these parameters while still maintaining overlap, it is possible to select the desired type of torque curve so as to provide an engine that is better under low speed low load operation or one which has better performance under high speed high load. The 120° angle chosen in the embodiment of FIGS. 3 through 8 provides a compromise between these two conditions.

The embodiment of the invention as thus far described has been described in conjunction with a two cylinder in-line engine. It should be apparent to those skilled in the art, however, from the foregoing description that the invention may be employed in conjunction with engines having other cylinder numbers and other cylinder configurations so long as at least two cylinders share a common portion of an exhaust manifold.

Figure 11:
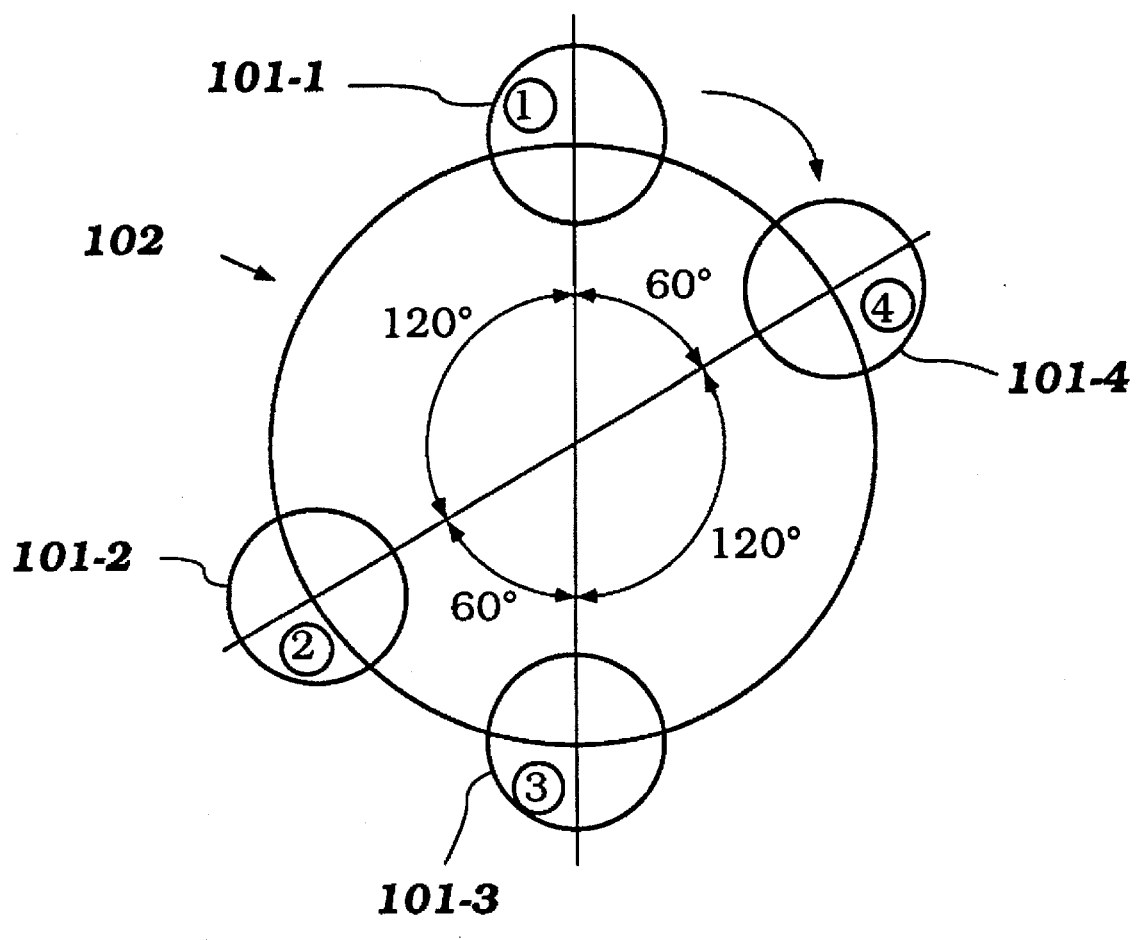
FIG. 11 is a top plan view showing the crankshaft relationship of an in line 4 engine constructed in accordance with another embodiment of the invention.
Figure 12:
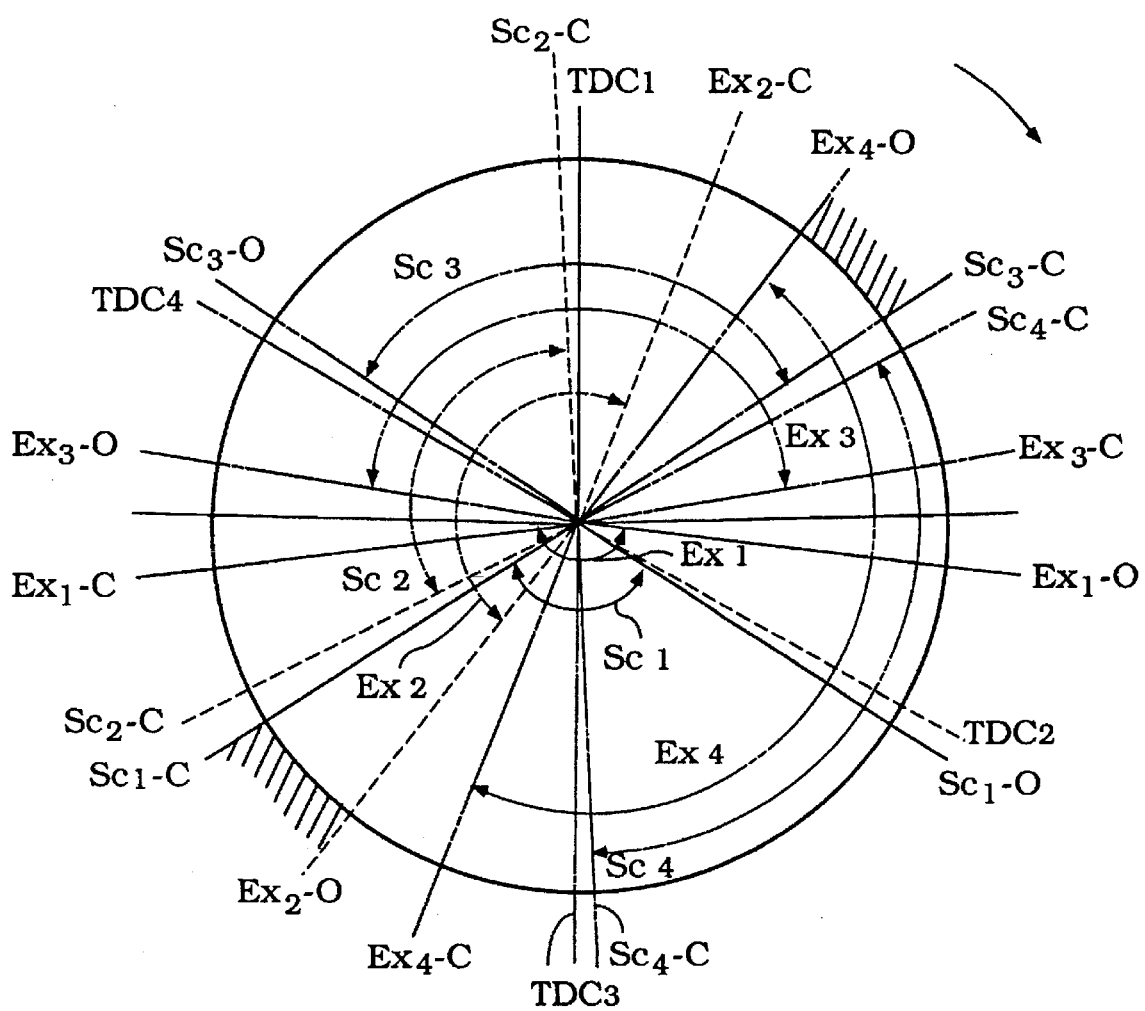
FIG. 12 is a timing diagram, in part similar to FIGS. 1 and 7, for the embodiment of FIG. 11.

FIGS. 11 and 12 show how the invention can be applied to a four cylinder in-line engine wherein all four cylinders communicate with a common exhaust manifold. FIG. 11 is a view similar to FIG. 5 and shows the relationship of the crank throws for this engine with the cylinder numbers 1, 2, 3 and 4 being numbered from one end of the engine to the other.

Figure 7:
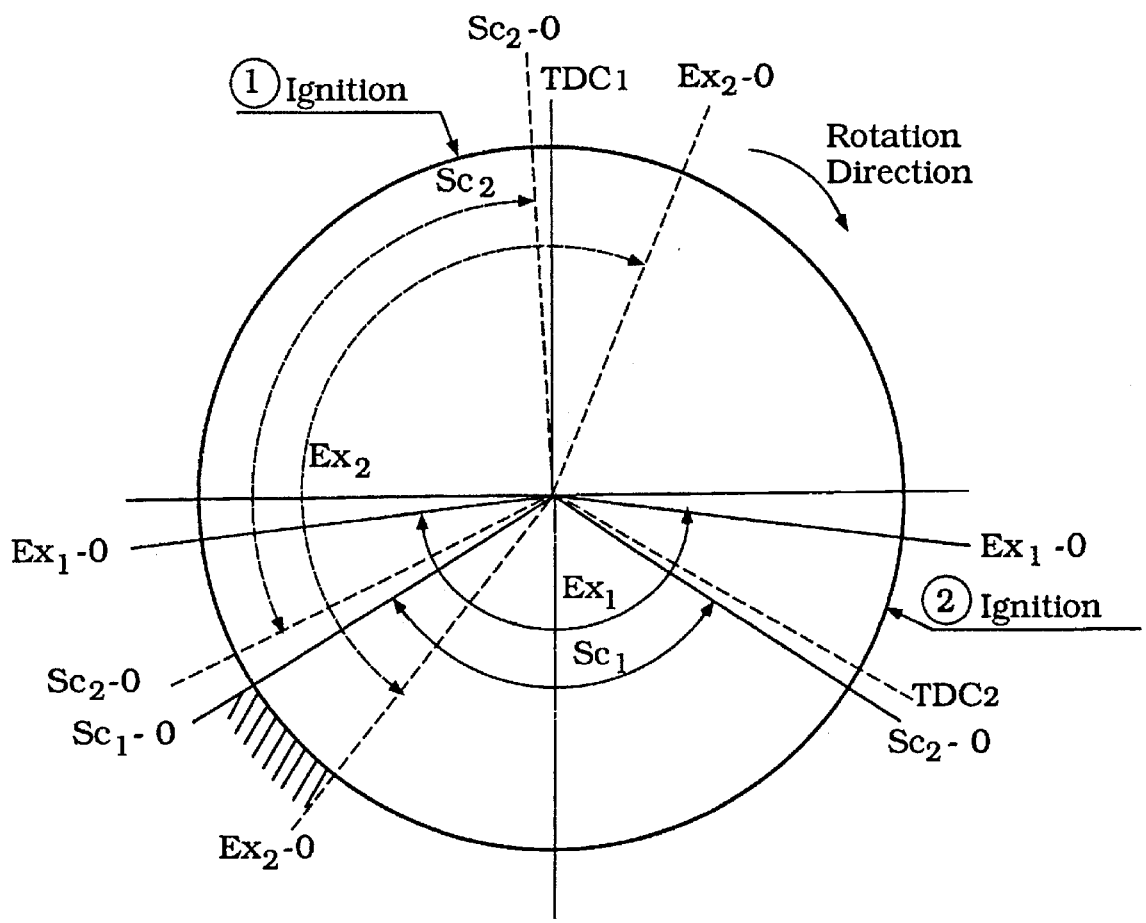
FIG. 7 is a timing diagram, in part similar to the prior art view of FIG. 1, that shows the timing diagram in accordance with this embodiment of the invention.
Figure 8:
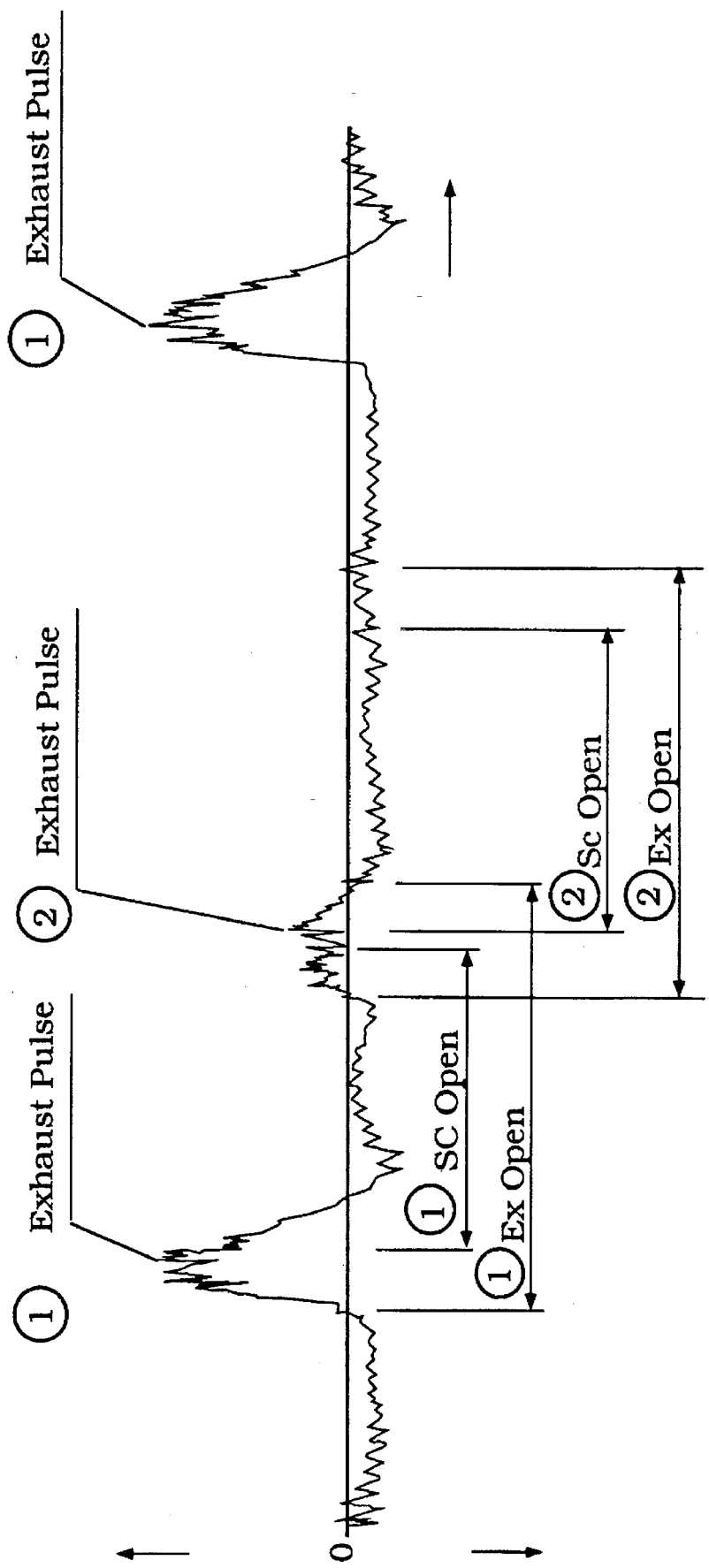
FIG. 8 is a graphical view, in part similar to the prior art view of FIG. 2, but shows how the scavenging effect of the engine can be improved by use of the invention.

Thus, there are provided crankshaft throws 101-1, 101-2, 101-3 and 101-4 all on a common crankshaft, indicated generally by the reference numeral 102. Cylinders 1 and 2 are adjacent to each other and are configured, like the embodiment thus far described, so that there will be 120° interval between the firing of cylinders 1 and 2 and the same condition exists between the exhaust pulses as shown in FIGS. 6 and 7. In a like manner, there is a 120° interval between the firing of cylinders 3 and 4 and, hence, these cylinders will also function to provide a timing event similar to that shown in FIGS. 6 and 7 between them.

Thus, from the foregoing description, it should be readily apparent to those skilled in the art that the invention is very useful in permitting the timing of the opening of the exhaust valves of one cylinder relative to those of another cylinder to be employed to assist the scavenging in that other cylinder. This can be done even in small areas where it is not possible to achieve this effect through exhaust pipe length tuning. Of course, the foregoing description is that of preferred embodiments of the invention and various changes and modifications may be made without departing from the spirit and scope of the invention, as defined by the appended claims.

I claim:

1. An internal combustion engine having at least two cylinders, exhaust ports for discharging the exhaust gases from said cylinders, means for opening and closing said exhaust ports, and an exhaust system for collecting the exhaust gases from said exhaust ports and discharging them to the atmosphere, said exhaust system having at least one common section serving a number of exhaust ports such that even timing of the served exhaust ports would not result in an overlap between the opening of one served port and the closing of another served exhaust port, the relative timing of exhaust ports of the served cylinders being modified from the even timing such that the exhaust port of one of said cylinders opens at a time before the exhaust port of another served cylinder closes.

2. An internal combustion engine having at least two cylinders as set forth in claim 1, wherein the engine operates on a two-stroke principle and further including a pair of scavenge ports each serving a respective one of the cylinders and wherein the scavenge ports and exhaust ports are opened and closed by movement of pistons within the cylinders.

3. An internal combustion engine having at least two cylinders as set forth in claim 2, wherein the timing is such that the exhaust port of the one cylinder opens at a time before the scavenge port of the other cylinder is closed.

4. An internal combustion engine having at least two cylinders as set forth in claim 1, wherein the engine is adapted to be employed in a vertical arrangement with the cylinders disposed one above the other.

5. An internal combustion engine having at least two cylinders as set forth in claim 4, wherein the one cylinder is the lowermost cylinder.

6. An internal combustion engine having at least two cylinders as set forth in claim 5, wherein the exhaust system has a common discharge opening that is disposed below the cylinders.

7. An internal combustion engine having at least two cylinders as set forth in claim 6, wherein the engine operates on a two-stroke principle and further including a pair of scavenge ports each serving a respective one of the cylinders and wherein the scavenge ports and exhaust ports are opened and closed by movement of pistons within the cylinders.

8. An internal combustion engine having at least two cylinders as set forth in claim 7, wherein the timing is such that the exhaust port of the one cylinder opens at a time before the scavenge port of the other cylinder is closed.

9. An internal combustion engine having at least two cylinders as set forth in claim 1, wherein the engine has at least four cylinders arranged in pairs of two cylinder groups each served by a respective common section having the exhaust port and timing events so that the opening of one of the exhaust ports of the pair occurs at a time before the exhaust port of the other pair closes.

10. An internal combustion engine having at least two cylinders as set forth in claim 9, wherein the engine operates on a two-stroke principle and further including a pair of scavenge ports each serving a respective one of the cylinders and wherein the scavenge ports and exhaust ports are opened and closed by movement of pistons within the cylinder.

11. An internal combustion engine having at least two cylinders as set forth in claim 10, wherein the timing is such that the exhaust port of the one cylinder opens at a time before the scavenge port of the other cylinder is closed.

12. An internal combustion engine having at least two cylinders as set forth in claim 9, wherein the engine is adapted to be employed in a vertical arrangement with the cylinders disposed one above the other.

13. An internal combustion engine having at least two cylinders as set forth in claim 12, wherein the one cylinder is the lowermost cylinder.

14. An internal combustion engine having at least two cylinders as set forth in claim 13, wherein the exhaust system has a common discharge opening that is disposed below the cylinders.

15. An internal combustion engine having at least two cylinders as set forth in claim 14, wherein the engine operates on a two-stroke principle and further including a pair of scavenge ports for each pair of cylinders each serving a respective one of the cylinders and wherein the scavenge ports and exhaust ports are opened and closed by movement of pistons within the cylinders.

16. An internal combustion engine having at least two cylinders as set forth in claim 15, wherein the timing is such that the exhaust port of the one cylinder opens at a time before the scavenge port of the other cylinder is closed.

17. A two stroke internal combustion engine having at least two cylinders, scavenge ports for admitting a charge into said cylinders, exhaust ports for discharging the exhaust gases from said cylinders, means for opening and closing said scavenge and said exhaust ports, and an exhaust system for collecting the exhaust gases from said exhaust ports and discharging them to the atmosphere, said exhaust system having a common section serving each of said exhaust ports, the relative timing of events of said two cylinders being such that the exhaust port of one of said cylinders opens at a time before the exhaust port of the other cylinder closes and such that said exhaust port of the one cylinder opens at a time before the scavenge port of the other cylinder is closed.

18. An internal combustion engine having at least two cylinders as set forth in claim 17, wherein the engine is adapted to be employed in a vertical arrangement with the cylinders disposed one above the other.

19. An internal combustion engine having at least two cylinders as set forth in claim 18, wherein the one cylinder is the lowermost cylinder.

20. An internal combustion engine having at least two cylinders as set forth in claim 19, wherein the exhaust system has a common discharge opening that is disposed below the cylinders.

* * * * *